United States Patent
Tanabe (10) Patent No.: US 11,117,788 B1
(45) Date of Patent: Sep. 14, 2021

(54) GUIDE RAIL CLEANING DEVICE

(71) Applicant: Mitsubishi Electric Corporation, Tokyo (JP)

(72) Inventor: Hirohito Tanabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 140 days.

(21) Appl. No.: 16/497,795

(22) PCT Filed: Jun. 7, 2017

(86) PCT No.: PCT/JP2017/021179
§ 371 (c)(1),
(2) Date: Sep. 26, 2019

(87) PCT Pub. No.: WO2018/225197
PCT Pub. Date: Dec. 13, 2018

(51) Int. Cl.
*B66B 31/00* (2006.01)
*B66B 23/02* (2006.01)
(Continued)

(52) U.S. Cl.
CPC .............. *B66B 31/00* (2013.01); *B65G 45/18* (2013.01); *B66B 23/024* (2013.01); *B65G 45/14* (2013.01)

(58) Field of Classification Search
CPC ....... B66B 31/00; B66B 23/024; B66B 23/14; B65G 45/18; B65G 45/14
(Continued)

(56) References Cited

U.S. PATENT DOCUMENTS

| 2,634,850 | A | * | 4/1953 | Hansen | B66B 31/003 198/322 |
| 5,025,527 | A | * | 6/1991 | Armstrong | B66B 31/003 15/160 |
| 5,042,641 | A | * | 8/1991 | Soldat | B66B 31/003 198/496 |

(Continued)

FOREIGN PATENT DOCUMENTS

| CN | 102020189 A | 4/2011 |
| JP | 58-89577 A | 5/1983 |

(Continued)

OTHER PUBLICATIONS

International Search Report and Written Opinion dated Aug. 8, 2017 for PCT/JP2017/021179 filed on Jun. 7, 2017, 8 pages including English Translation of the International Search Report.

(Continued)

*Primary Examiner* — James R Bidwell
(74) *Attorney, Agent, or Firm* — Xsensus LLP (57) ABSTRACT

Provided is a guide rail cleaning device, including: a first cleaning portion including a first cleaning member configured to clean a driving-roller guide rail for a step; a second cleaning portion including a second cleaning member configured to clean a trailing-roller guide rail; and a mounting plate. The mounting plate is removably mounted to a step shaft having a driving roller fixed thereto. The first cleaning portion and the second cleaning portion are mounted to the mounting plate. The first cleaning member is brought into abutment against the driving-roller guide rail. The second cleaning member is brought into abutment against the trailing-roller guide rail. With this, the driving-roller guide rail and the trailing-roller guide rail are simultaneously cleaned through use of the first cleaning member and the second cleaning member.

8 Claims, 6 Drawing Sheets

(51) Int. Cl.
*B65G 45/18* (2006.01)
*B65G 45/14* (2006.01)

(58) Field of Classification Search
USPC .................................. 198/326, 332, 496, 498
See application file for complete search history.

(56) References Cited

U.S. PATENT DOCUMENTS

| | | | | |
|---|---|---|---|---|
| 5,117,968 | A * | 6/1992 | Rivera | B66B 31/02 198/338 |
| 5,893,450 | A * | 4/1999 | Metivier | B65G 45/18 198/496 |
| 6,629,596 | B2 * | 10/2003 | Teuber | B65G 45/18 198/496 |
| 8,573,385 | B2 * | 11/2013 | Yun | B66B 31/003 198/498 |

FOREIGN PATENT DOCUMENTS

| | | |
|---|---|---|
| JP | 61-183084 A | 8/1986 |
| JP | 63-139892 A | 6/1988 |
| JP | 02-139881 U | 11/1990 |
| JP | 05-072877 U | 10/1993 |
| JP | 2011-514299 A | 5/2011 |
| JP | 2012-140238 A | 7/2012 |

OTHER PUBLICATIONS

Office Action dated May 28, 2020 in Chinese Patent Application No. 201780091395.2, 14 pages.

* cited by examiner

GUIDE RAIL CLEANING DEVICE

CROSS-REFERENCE TO RELATED APPLICATIONS

The present application is based on PCT filing PCT/JP2017/021179, filed Jun. 7, 2017, the entire contents of which are incorporated herein by reference.

TECHNICAL FIELD

The present invention relates to a guide rail cleaning device, which is configured to clean guide rails for steps of a passenger conveyor.

BACKGROUND ART

In general, a passenger conveyor includes handrail belts and steps. The steps are coupled to one another in an endless manner. A pair of driving rollers and a pair of trailing rollers are provided to each of the steps. The driving rollers and the trailing rollers are configured to roll on driving-roller guide rails and trailing-roller guide rails, respectively, which are provided within a frame of the passenger conveyor. In the passenger conveyor having such a configuration, dust adhering to, for example, shoes of a passenger falls onto the step and is accumulated on the step. Oiliness is given to the dust due to application of a lubricating oil supplied to, for example, step chains, with the result that the dust becomes an adhering object having a high viscosity. The dust being the adhering object may hinder rolling of the driving rollers and the trailing rollers on surfaces of the guide rails and cause vibration of the steps.

Therefore, as mechanisms for cleaning rail surfaces of guide rails, there have hitherto been proposed, for example, a mechanism including cleaning tools fixed to step driving chains and allowing the cleaning tools to slide on guide rails, a mechanism including removable brackets fixed to a frame configured to support a rotation shaft of trailing rollers and allowing cleaning bodies provided on the brackets to roll on trailing-roller guide rails, and a mechanism including a cleaning device formed of first and second cleaning members in contact with driving-roller guide rails and trailing-roller guide rails and provided to frame bodies mounted in place of steps and being configured to simultaneously clean the driving-roller guide rails and the trailing-roller guide rails (for example, see Patent Literature 1 and Patent Literature 2).

CITATION LIST

Patent Literature

[PTL 1] JP 61-183084 A
[PTL 2] JP 63-139892 A

SUMMARY OF INVENTION

Technical Problem

The cleaning device described in Patent Literature 1 is configured to separately clean the guide rails for driving rollers and guide rails for trailing rollers. Thus, it requires a long working time. The cleaning device described in Patent Literature 2 is capable of simultaneously cleaning guide rails for driving rollers and the guide rails for trailing rollers. However, the frame body of the device is large, and significant man-hours are required for installation. Thus, the cleaning device described in Patent Literature 2 cannot be applied to a passenger conveyor having structure in which driving rollers are incorporated within drive chains.

The present invention has been made to solve the problems described above, and has an object to obtain a guide rail cleaning device which is capable of simultaneously cleaning driving-roller guide rails and trailing-roller guide rails even in a passenger conveyor having structure in which driving rollers are incorporated within drive chains.

Solution to Problem

According to one embodiment of the present invention, there is provided a guide rail cleaning device the guide rail cleaning device including: a first cleaning portion configured to clean a driving-roller guide rail for allowing a driving roller of a step to roll thereon; a second cleaning portion configured to clean a trailing-roller guide rail for allowing a trailing roller of the step to roll thereon; and a mounting plate, wherein the first cleaning portion includes a first cleaning member configured to clean the driving-roller guide rail, wherein the second cleaning portion includes a second cleaning member configured to clean the trailing-roller guide rail, wherein the mounting plate is removably mounted to a step shaft having the driving roller fixed thereto, wherein the first cleaning portion and the second cleaning portion are mounted to the mounting plate, wherein the first cleaning member is brought into abutment against the driving-roller guide rail, wherein the second cleaning member is brought into abutment against the trailing-roller guide rail, and wherein the driving-roller guide rail and the trailing-roller guide rail are simultaneously cleaned through use of the first cleaning member and the second cleaning member.

Advantageous Effects of Invention

According to the present invention, in the guide rail cleaning device, a mechanism for cleaning the driving-roller guide rails for the steps and a mechanism for cleaning the trailing-roller guide rails for the steps are integrated, thereby being capable of simultaneously cleaning the driving-roller guide rails and the trailing-roller guide rails through only one traveling of the steps. With this, a cleaning time for the driving-roller guide rails and the trailing-roller guide rails can be shortened.

DESCRIPTION OF EMBODIMENTS

Now, with reference to the drawings, a guide rail cleaning device according to exemplary embodiments of the present invention is described.

First Embodiment

Figure 1:
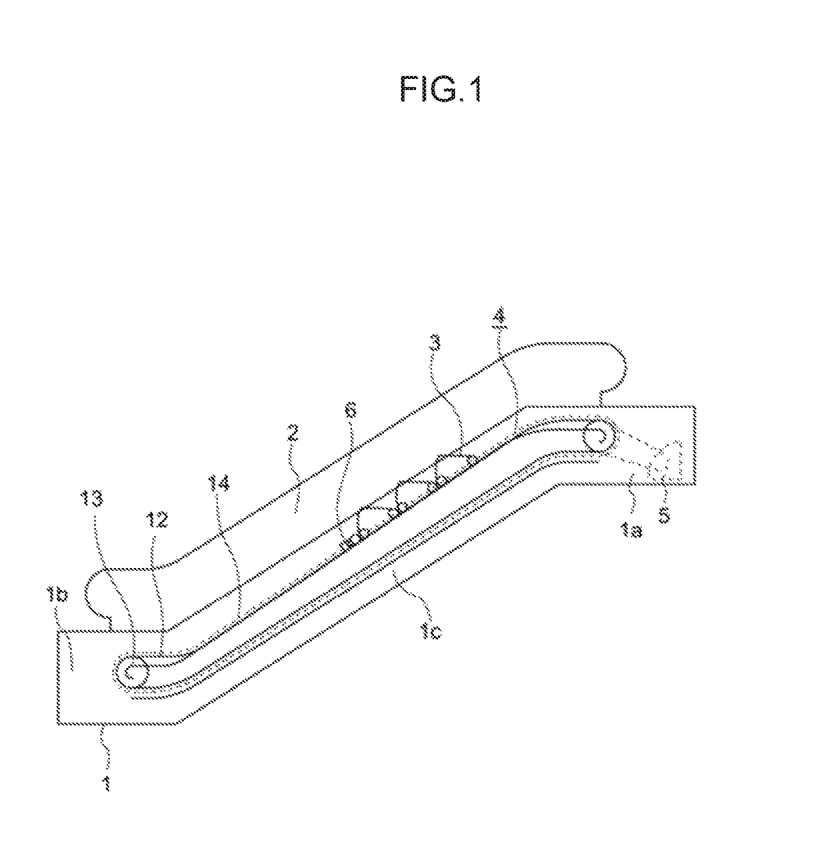
FIG. 1 is a schematic view for illustrating a passenger conveyor to which a guide rail cleaning device according to a first embodiment of the present invention is mounted.

FIG. 1 is a schematic view for illustrating a passenger conveyor to which a guide rail cleaning device 100 according to a first embodiment of the present invention is mounted. A main frame 1 extends between an upper floor and a lower floor. The main frame 1 includes an upper-floor-side horizontal portion 1a, a lower-floor-side horizontal portion 1b, and an inclination portion 1c located between the upper-floor-side horizontal portion 1a and the lower-floor-side horizontal portion 1b. On an upper side of the main frame 1, there are provided balustrades 2 extending in a longitudinal direction of the main frame 1. Within the main frame 1, there are provided a plurality of steps 3, a step driving device 4, and a drive machine 5. The steps 3 are configured to circulate. The step driving device 4 is configured to allow the steps 3 to circulate. The drive machine 5 is configured to generate motive power for driving the step driving device 4. The drive machine 5 is arranged at the upper-floor-side horizontal portion 1a of the main frame 1.

Figure 2:
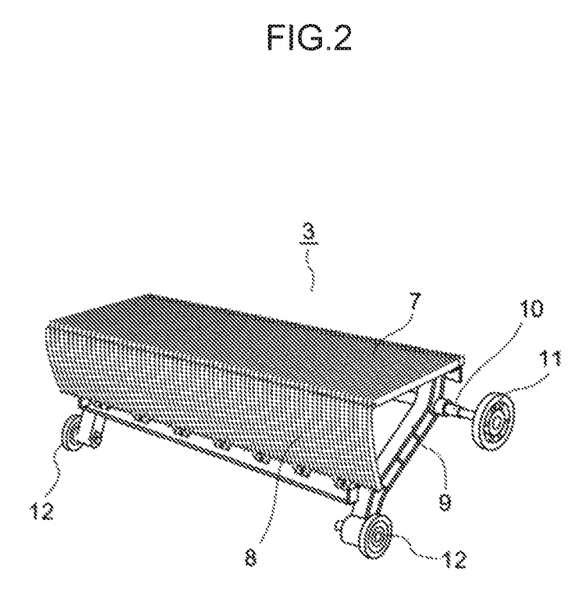
FIG. 2 is a perspective view for illustrating a step of the passenger conveyor illustrated in FIG. 1.

FIG. 2 is a perspective view for illustrating the step 3 illustrated in FIG. 1. The step 3 includes a step tread 7, a riser 8, a pair of brackets 9, a step shaft 10, driving rollers 11, and a pair of trailing rollers 12. The riser 8 is provided at a rear-step-side end portion of the step tread 7. The pair of brackets 9 are configured to couple the step tread 7 and the riser 8 to each other. The step shaft 10 is provided at a front-step-side portion of the brackets 9. The driving rollers 11 are provided to the step shaft 10. The pair of trailing rollers 12 are provided at a rear-step-side portion of the brackets 9.

The brackets 9 are arranged apart from each other in a width direction of the step 3. The step shaft 10 is arranged so that an axial direction of the step shaft 10 is oriented in the width direction of the step 3. Further, the step shaft 10 penetrates through each of the brackets 9.

The driving rollers 11 are mounted to both end portions of the step shaft 10, respectively. Further, the driving rollers 11 are arranged on outer sides with respect to the brackets 9 in the width direction of the step 3. The trailing rollers 12 are arranged apart from each other in the width direction of the step 3. Further, the trailing rollers 12 are arranged on inner sides with respect to the driving rollers 11 in the width direction of the step 3.

Figure 3:
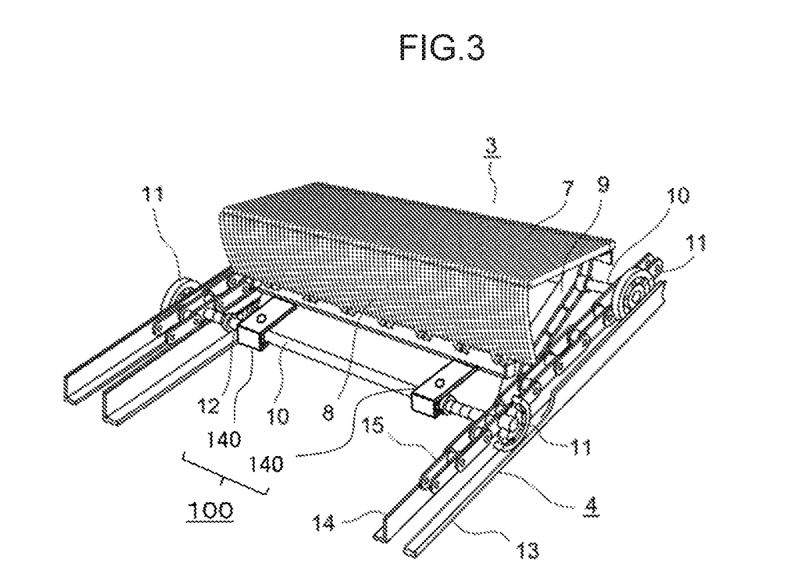
FIG. 3 is a perspective view for illustrating a state in which the guide rail cleaning device according to the first embodiment is mounted to the step and a step driving device of the passenger conveyor illustrated in FIG. 1.

FIG. 3 is a perspective view for illustrating the step 3 and the step driving device 4 illustrated in FIG. 1. The step driving device 4 includes a pair of driving-roller guide rails 13, a pair of trailing-roller guide rails 14, and a pair of step chains 15. The pair of driving-roller guide rails 13 are configured to guide the driving rollers 11. The pair of trailing-roller guide rails 14 are configured to guide the trailing rollers 12. The pair of step chains 15 each have an endless shape, and are configured to couple the steps 3. Drive power generated through driving of the drive machine 5 is transmitted to each of the step chains 15. The step chains 15 receive the drive power transmitted thereto and circulate in synchronization with each other.

The step chains 15 are arranged on inner sides with respect to the driving-roller guide rails 13 in the width direction of the step 3 and on outer sides with respect to the trailing-roller guide rails 14 in the width direction of the step 3. The guide rail cleaning device 100 is mounted to the step shaft 10 below the step tread 7.

Figure 4:
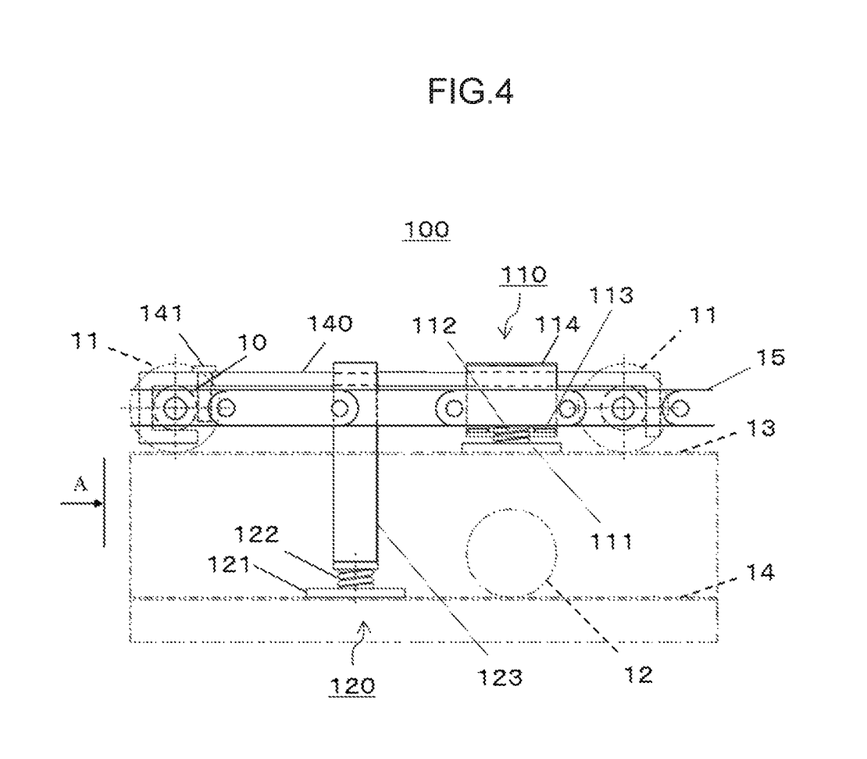
FIG. 4 is a schematic view for illustrating the guide rail cleaning device according to the first embodiment as viewed from a side.
Figure 5:
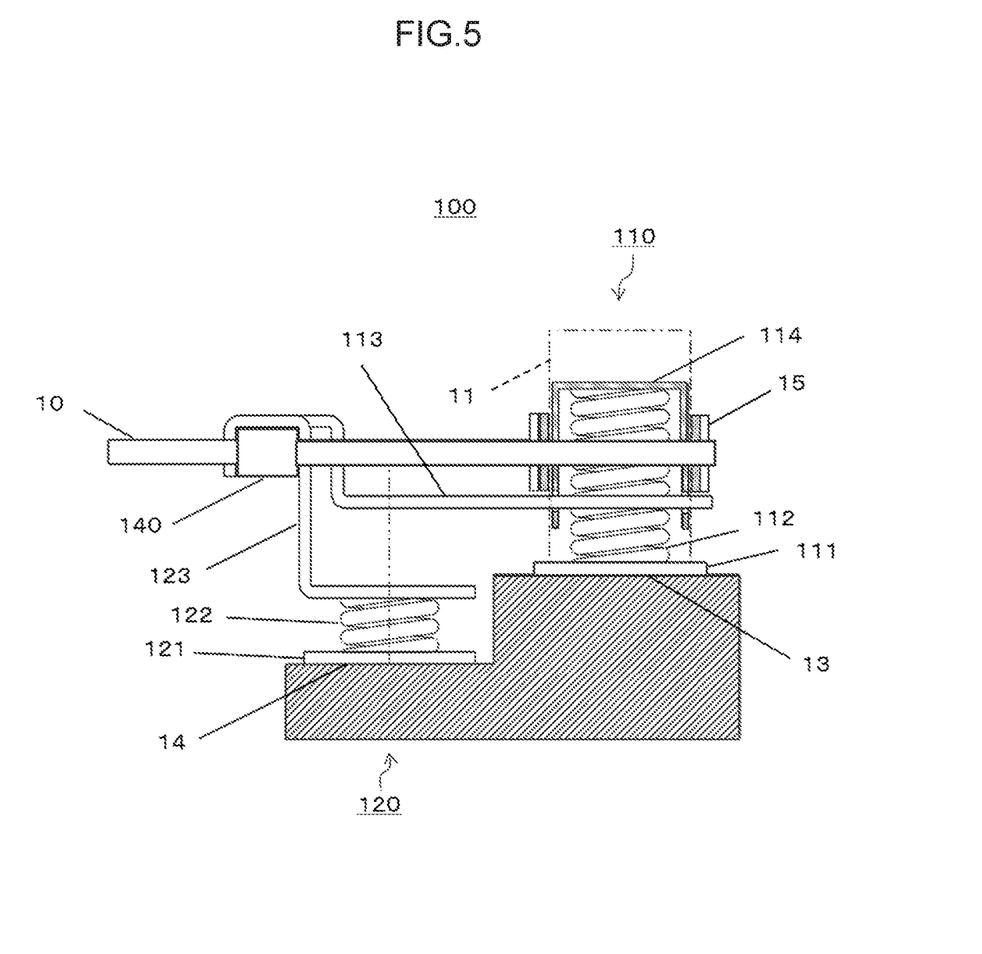
FIG. 5 is a view for illustrating the guide rail cleaning device illustrated in FIG. 4 as viewed from the direction indicated by the arrow A.
Figure 6:
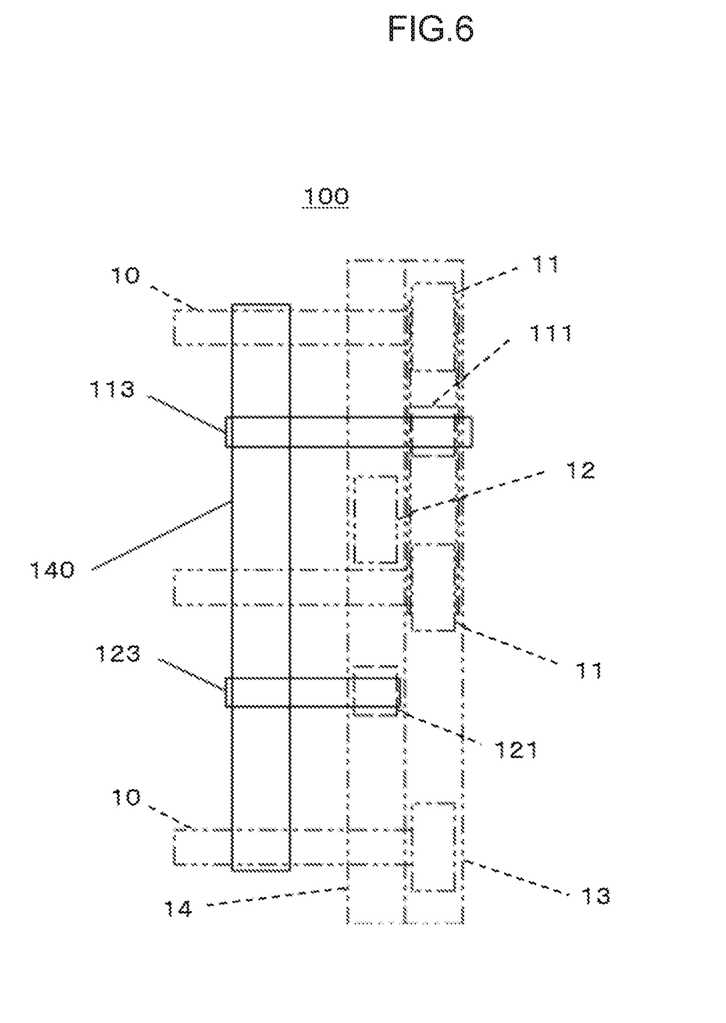
FIG. 6 is a schematic view for illustrating the guide rail cleaning device as viewed from above.

Next, with reference to FIG. 4 to FIG. 6, description is made of the guide rail cleaning device 100 according to the first embodiment. FIG. 4 is a schematic view for illustrating the guide rail cleaning device 100 according to the first embodiment as viewed from a side. FIG. 5 is a view for illustrating the guide rail cleaning device 100 illustrated in FIG. 4 as viewed from the direction indicated by the arrow A. FIG. 6 is a schematic view for illustrating the guide rail cleaning device 100 as viewed from above. In FIG. 4 to FIG. 6, only one side of the step 3 in the width direction is illustrated. However, another side of the step 3 has a similar configuration.

As illustrated in FIG. 4 and FIG. 5, the guide rail cleaning device 100 according to the first embodiment includes a first cleaning portion 110, a second cleaning portion 120, and a mounting plate 140. The first cleaning portion 110 is configured to clean the driving-roller guide rail 13. The second cleaning portion 120 is configured to clean the trailing-roller guide rail 14.

The first cleaning portion 110 includes a sponge 111, a spring 112, a first bracket 113, and a frame 114. One end side of the spring 112 is fixed to the frame 114, and the sponge 111 is mounted on another end side of the spring 112. The spring 112 can be extended and compressed within the frame 114. The frame 114 is fixed on one end side of the first bracket 113.

The second cleaning portion 120 includes a sponge 121, a spring 122, and a second bracket 123. One end side of the spring 112 is fixed to the second bracket 123, and the sponge 111 is mounted on another end side of the spring 112.

As illustrated in FIG. 4 to FIG. 6, the mounting plate 140 is an elongated member. As illustrated in FIG. 4, one end side of the mounting plate 140 is bent into a U-shape, and another end side of the mounting plate 140 is bent into an L-shape. The U-shaped one end side of the mounting plate 140 is caught on any appropriate step shaft 10. Then, a fixing pin 141 is inserted into a through hole (not shown) formed in the mounting plate 140. Accordingly, the mounting plate 140 is fixed so as to be prevented from being displaced from the step shaft 10. The another end side of the mounting plate 140 is caught on another step shaft 10 over one step shaft 10.

As illustrated in FIG. 5 and FIG. 6, the first bracket 113 and the second bracket 123 are fixed by bolts (not shown) to the mounting plate 140 fixed to the step shaft 10. On this occasion, as illustrated in FIG. 4 and FIG. 5, the sponge 111 of the first bracket 113 is pressed by the spring 112 against a rail surface of the driving-roller guide rail 13. Further, the sponge 121 of the second bracket 123 is pressed by the spring 122 against a rail surface of the trailing-roller guide rail 14.

Through movement of the step 3 in this state, a foreign matter adhering to the rail surface of the driving-roller guide rail 13 is removed by the sponge 111. At the same time, a foreign matter adhering to the rail surface of the trailing-roller guide rail 14 is removed by the sponge 121.

As described above, according to the guide rail cleaning device 100 of the first embodiment, the first cleaning portion 110 and the second cleaning portion 120 are fixed to the mounting plate 140 fixed to the step shaft 10 of the step 3. The sponge 111 configured to clean the rail surface of the driving-roller guide rail 13 is mounted to the first cleaning portion 110, and the sponge 121 configured to clean the rail surface of the trailing-roller guide rail 14 is mounted to the second cleaning portion 120. Further, the sponge 111 is pressed by the spring 112 against the rail surface of the driving-roller guide rail 13, and the sponge 1121 is pressed by the spring 122 against the rail surface of the trailing-roller guide rail 14. Through movement of the step 3 in this state, the foreign matter adhering to the rail surface of the driving-roller guide rail 13 is removed through use of the sponge 111, and the foreign matter adhering to the rail surface of the trailing-roller guide rail 14 is removed through use of the sponge 1121. With this, the rail surface of the driving-roller guide rail 13 and the rail surface of the trailing-roller guide rail 14 can be cleaned through only one traveling of the step 3.

Further, in the guide rail cleaning device 100 according to the first embodiment, as illustrated in FIG. 5, the first bracket 113 is arranged below the step chain 15 mounted to the step shaft 10. With this, the driving-roller guide rail 13 can be cleaned under a state in which the first bracket 113 forming the first cleaning portion 110 does not interfere with the step chain 15.

Moreover, the mounting plate 140 of the guide rail cleaning device 100 is removably mounted to the step shaft 10. Therefore, the guide rail cleaning device 100 can be mounted to the step shaft 10 only at the time of cleaning the driving-roller guide rail 13 and the trailing-roller guide rail 14. With this, the guide rail cleaning device 100 can be prolonged in lifetime.

In the first embodiment, an escalator apparatus is described as an example of a passenger conveyor to which the guide rail cleaning device 100 is applied. However, the passenger conveyor may be a moving walk.

Further, cleaning may be performed with the sponge 111 of the first cleaning portion 110 and the sponge 121 of the second cleaning portion 120 each having a solvent such as alcohol or a detergent instilled therein. In this case, after the cleaning, the sponge 111 and the sponge 121 may be replaced with felt having a lubricant such as a lubricating oil or grease instilled therein, and the step 3 may be allowed to travel again. With this, the number of traveling of the step 3 increases, but a foreign matter adhering to the rail surfaces can be removed better, and the lubricant can be applied.

In the guide rail cleaning device 100 according to the first embodiment, the sponge 111 and the sponge 121 are used for cleaning the rail surfaces of the driving-roller guide rail 13 and the trailing-roller guide rail 14. However, a member to be used for cleaning is not limited to the sponge. For example, the sponge 111 and the sponge 121 may be replaced with brushes or rubber blades.

REFERENCE SIGNS LIST 1 main frame, 2 balustrade, 3 step, 4 step driving device, 5 drive machine, 7 step tread, 8 riser, 9 bracket, 10 step shaft, 11 driving roller, 12 trailing roller, 13 driving-roller guide rail, 14 trailing-roller guide rail, 15 step chain, 100 guide rail cleaning device, 110 first cleaning portion, 111 sponge (first cleaning member), 112 spring (first urging member), 113 first bracket (bracket), 114 frame, 120 second cleaning portion, 121 sponge (second cleaning member), 122 spring (second urging member), 123 second bracket, 140 mounting plate, 141 fixing pin

The invention claimed is:

1. A guide rail cleaning device, which is configured to clean a driving-roller guide rail for allowing a driving roller of a step to roll thereon and a trailing-roller guide rail for allowing a trailing roller of the step to roll thereon, the guide rail cleaning device comprising:
a first cleaning portion;
a second cleaning portion; and
a mounting plate,
wherein the first cleaning portion includes a first cleaning member configured to clean the driving-roller guide rail,
wherein the second cleaning portion includes a second cleaning member configured to clean the trailing-roller guide rail,
wherein the mounting plate is removably mounted to a step shaft having the driving roller fixed thereto,
wherein the first cleaning portion and the second cleaning portion are mounted to the mounting plate,
wherein the first cleaning member is brought into abutment against the driving-roller guide rail,
wherein the second cleaning member is brought into abutment against the trailing-roller guide rail, and
wherein the driving-roller guide rail and the trailing-roller guide rail are simultaneously cleaned through use of the first cleaning member and the second cleaning member.

2. The guide rail cleaning device according to claim 1, wherein the first cleaning portion is fixed to the mounting plate by a bracket, and
wherein the bracket is arranged below a drive chain configured to drive the driving roller.

3. The guide rail cleaning device according to claim 1, wherein the first cleaning portion includes a first urging member configured to press the first cleaning member against the driving-roller guide rail, and
wherein the second cleaning portion includes a second urging member configured to press the second cleaning member against the trailing-roller guide rail.

4. The guide rail cleaning device according to claim 1, wherein the first cleaning member and the second cleaning member each comprise a sponge.

5. The guide rail cleaning device according to claim 2, wherein the first cleaning portion includes a first urging member configured to press the first cleaning member against the driving-roller guide rail, and
wherein the second cleaning portion includes a second urging member configured to press the second cleaning member against the trailing-roller guide rail.

6. The guide rail cleaning device according to claim 2, wherein the first cleaning member and the second cleaning member each comprise a sponge.

7. The guide rail cleaning device according to claim 3, wherein the first cleaning member and the second cleaning member each comprise a sponge.

8. The guide rail cleaning device according to claim 5, wherein the first cleaning member and the second cleaning member each comprise a sponge.

* * * * *